United States Patent
Son et al.

(10) Patent No.: US 10,542,149 B2
(45) Date of Patent: Jan. 21, 2020

(54) CUSTOMER SERVING CONTROL SYSTEM, CUSTOMER SERVING SYSTEM AND COMPUTER-READABLE MEDIUM

(71) Applicant: SOFTBANK ROBOTICS CORP., Tokyo OT (JP)

(72) Inventors: Masayoshi Son, Tokyo (JP); Takashi Tsutsui, Tokyo (JP); Kosuke Tomonaga, Tokyo (JP); Kiyoshi Oura, Tokyo (JP)

(73) Assignee: SoftBank Robotics Corp., Tokyo (JP)

( * ) Notice: Subject to any disclaimer, the term of this patent is extended or adjusted under 35 U.S.C. 154(b) by 0 days.

(21) Appl. No.: 16/188,272

(22) Filed: Nov. 12, 2018

(65) Prior Publication Data

US 2019/0082055 A1    Mar. 14, 2019

Related U.S. Application Data

(63) Continuation of application No. PCT/JP2017/014877, filed on Apr. 11, 2017.

(30) Foreign Application Priority Data

May 16, 2016    (JP) .................................. 2016-097819

(51) Int. Cl.
*H04M 3/00*    (2006.01)
*H04M 3/58*    (2006.01)
(Continued)

(52) U.S. Cl.
CPC ............ *H04M 3/58* (2013.01); *G06Q 30/016* (2013.01); *G10L 15/22* (2013.01); *G10L 25/63* (2013.01);
(Continued)

(58) Field of Classification Search
CPC .............................. H04M 3/58; G06Q 30/016
(Continued)

(56) References Cited

U.S. PATENT DOCUMENTS 6,396,919 B1    5/2002 Shimada
7,720,784 B1 *  5/2010 Froloff .................. A61B 5/165
                                                          600/300

(Continued)

FOREIGN PATENT DOCUMENTS

JP    2004252668 A    9/2004
JP    2007286376 A    11/2007
(Continued)

OTHER PUBLICATIONS

International Preliminary Report on Patentability for International Application No. PCT/JP2017/014877, issued by the International Bureau of WIPO dated Nov. 20, 2018.

(Continued)

*Primary Examiner* — William J Deane, Jr.

(57) ABSTRACT

A customer serving control system includes: a customer information acquiring unit acquiring customer information about a customer that can be served by a customer serving apparatus; a presentation control unit causing the customer information to be presented to a first operator; a serving information generating unit generating, based on operation of the first operator, first serving information indicating a serving content according to which the customer serving apparatus should serve the customer; a serving control unit causing the first operator to serve the customer through the customer serving apparatus by instructing the customer serving apparatus to serve the customer based on the first serving information; an operator emotion identifying unit identifying an emotion of the first operator; and a serving determining unit determining, based on an emotion of the first operator, whether to maintain a state where the first (Continued)

operator is serving the customer through the customer serving apparatus.

13 Claims, 11 Drawing Sheets

(51) Int. Cl.
    *G10L 25/63*           (2013.01)
    *G06Q 30/00*         (2012.01)
    *G10L 15/22*         (2006.01)
    *H04M 3/51*          (2006.01)

(52) U.S. Cl.
    CPC ....... *H04M 3/5175* (2013.01); *H04M 3/5183* (2013.01)

(58) Field of Classification Search
    USPC ....... 379/265.01–265.14, 266.01–266.1, 309
    See application file for complete search history.

(56) References Cited

U.S. PATENT DOCUMENTS

| | | | |
|---|---|---|---|
| 2002/0016783 A1 | 2/2002 | Kayaba | |
| 2002/0194002 A1 | 12/2002 | Petrushin | |
| 2004/0001616 A1* | 1/2004 | Gutta | G06Q 30/02 |
| | | | 382/118 |
| 2010/0205129 A1* | 8/2010 | Aaron | G06Q 30/02 |
| | | | 706/14 |
| 2010/0278318 A1 | 11/2010 | Flockhart | |
| 2011/0201960 A1* | 8/2011 | Price | A61B 5/01 |
| | | | 600/549 |
| 2012/0317038 A1* | 12/2012 | Erbey | H04M 3/5183 |
| | | | 705/304 |
| 2013/0039483 A1* | 2/2013 | Wolfeld | H04M 3/00 |
| | | | 379/265.03 |
| 2014/0257820 A1 | 9/2014 | Laperdon | |
| 2015/0235655 A1* | 8/2015 | Dimitriadis | G10L 25/63 |
| | | | 704/270 |
| 2015/0310877 A1* | 10/2015 | Onishi | H04M 3/51 |
| | | | 704/246 |
| 2016/0240214 A1* | 8/2016 | Dimitriadis | G10L 25/63 |
| 2018/0047030 A1* | 2/2018 | Saso | G06Q 30/016 |
| 2019/0005421 A1* | 1/2019 | Hammel | G06Q 10/067 |
| 2019/0033957 A1* | 1/2019 | Shionozaki | G06F 3/0487 |

FOREIGN PATENT DOCUMENTS

| | | |
|---|---|---|
| JP | 2009294647 A | 12/2009 |
| JP | 2011198061 A | 10/2011 |
| JP | 2011253389 A | 12/2011 |
| JP | 2015049337 A | 3/2015 |
| JP | 2015141428 A | 8/2015 |

OTHER PUBLICATIONS

International Search Report for International Patent Application No. PCT/JP2017/014877, issued by the Japan Patent Office dated Jun. 13, 2017.

Office Action issued for counterpart Japanese Application No. 2016-097819, issued by the Japan Patent Office dated May 30, 2017.

Extended European Search Report issued for counterpart European Application No. 17799078.5, issued by the European Patent Office dated Mar. 20, 2019.

* cited by examiner

| OPERATOR IDENTIFICATION INFO | CUSTOMER ATTRIBUTE | EMOTION | SERVING PAST RECORD VALUE |
|---|---|---|---|
| OP#111 | 20S MALE *** | ANGRY | 20pt |
| ... | ... | ... | ... |

*FIG. 11*

CUSTOMER SERVING CONTROL SYSTEM, CUSTOMER SERVING SYSTEM AND COMPUTER-READABLE MEDIUM

The contents of the following patent applications are incorporated herein by reference:

Japanese Patent Application No. 2016-097819 filed on May 16, 2016 and International Patent Application No. PCT/JP2017/014877 filed on Apr. 11, 2017.

BACKGROUND

1. Technical Field

The present invention relates to a customer serving control system, a customer serving system and a computer-readable medium.

2. Related Art

A terminal that studies conversations between a user and another person that the user is talking to on the phone and accumulates, in a reply table, replies from the other person on the phone to questions from the user has been known (please see Patent Literature 1, for example).

PRIOR ART LITERATURE

Patent Literature

[Patent Literature 1] Japanese Patent Application Publication No. 2011-253389

In a system in which operators serve customers through customer serving apparatuses, it is not possible to serve the customers appropriately depending on the states of the operators in some cases.

BRIEF DESCRIPTION OF THE DRAWINGS

FIG. 3 is a figure for schematically explaining a sequence in a situation where a robot 40a in an autonomous operation state is serving a customer 50a.

FIG. 4 is a figure for schematically explaining a sequence until an operator 80a is requested to serve the customer 50a.

FIG. 5 schematically shows a display content of a serving notification by an operator terminal 70a.

FIG. 7 schematically shows a sequence in a situation where the robot 40a is serving the customer 50a based on an action of the operator 80a.

FIG. 11 schematically shows a past record table used for selecting an appropriate operator 80.

DESCRIPTION OF EXEMPLARY EMBODIMENTS

Figure 1:
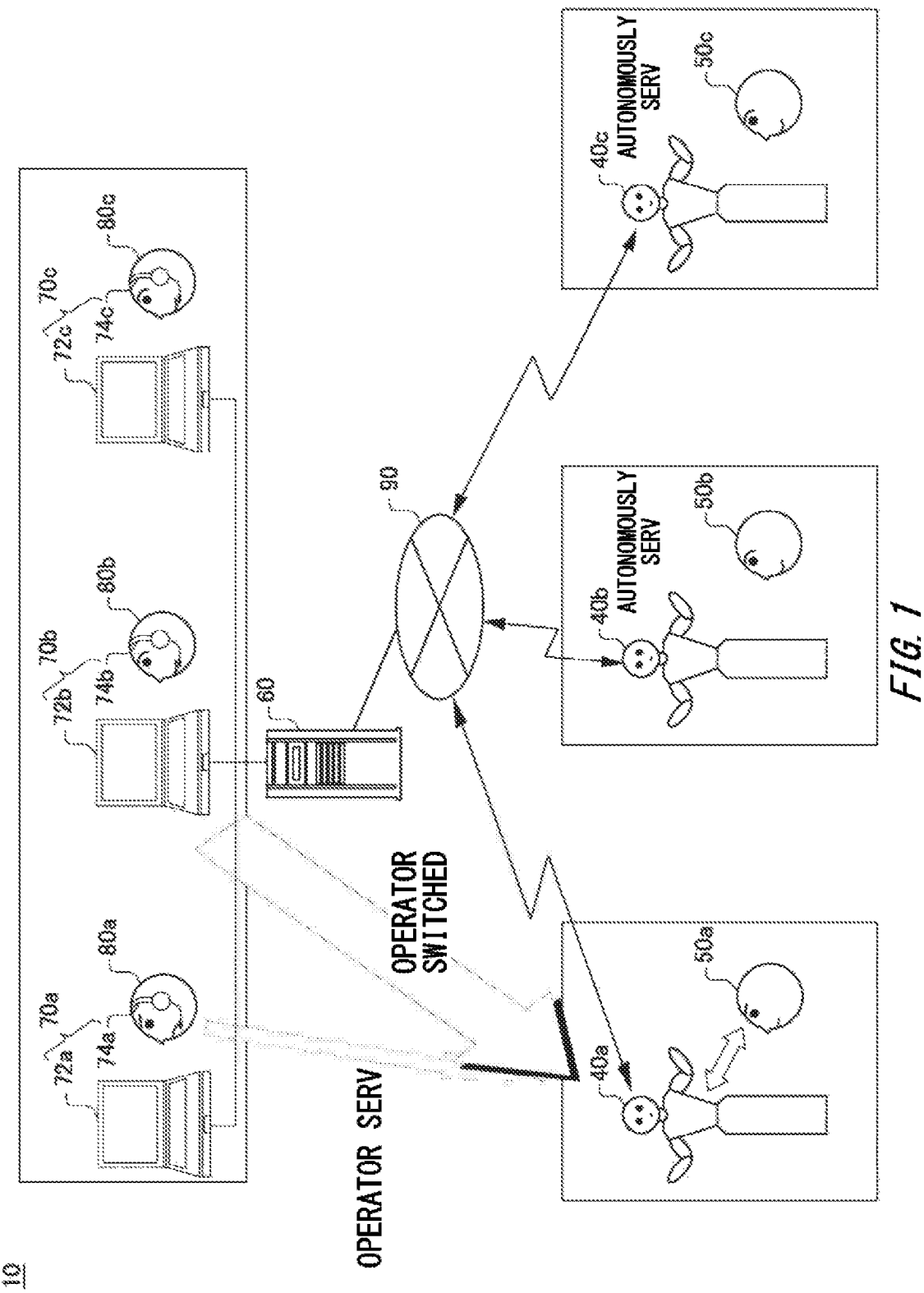
FIG. 1 schematically shows one example of usage situations of a customer serving system 10 according to the present embodiment.

Various embodiments of the present invention may be described with reference to flowcharts and block diagrams whose blocks may represent (1) steps of processes in which operations are performed or (2) units of apparatuses responsible for performing operations. Certain steps and units may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

FIG. 1 schematically shows one example of usage situations of a customer serving system 10 according to the present embodiment. The customer serving system 10 includes: a server 60; a robot 40a, a robot 40b and a robot 40c; and an operator terminal 70a, an operator terminal 70b and an operator terminal 70c. The constituent portion including: the operator terminal 70a, operator terminal 70b and operator terminal 70c; and the server 60 functions also as a customer serving control system.

The robot 40a, robot 40b and robot 40c are provided remotely from the operator terminal 70a, operator terminal 70b and operator terminal 70c. In addition, the robot 40a, robot 40b and robot 40c are provided remotely also from the server 60. An operator 80a uses the operator terminal 70a to be able to manipulate any of the robot 40a, robot 40b and robot 40c through the server 60 and a communication network 90. Likewise, an operator 80b uses the operator terminal 70b to be able to manipulate any of the robot 40a, robot 40b and robot 40c through the server 60 and the communication network 90. An operator 80c uses the operator terminal 70c to be able to manipulate any of the robot 40a, robot 40b and robot 40c through the server 60 and the communication network 90.

The robot 40a, robot 40b and robot 40c are arranged at a reception desk of a store or office or the like, for example, and can autonomously serve visiting customers. In the situation shown in FIG. 1, the robot 40b is autonomously serving a customer 50b. The robot 40c is autonomously serving a customer 50c.

The operator 80a is serving a customer 50a through the operator terminal 70a, the server 60 and the robot 40a. The robot 40a has a camera function and a microphone function, and transmits a captured image and a sound of the customer 50a to the server 60 through the communication network 90. The server 60 transmits, to the operator terminal 70a and through the communication network 90, the received image and sound.

The operator terminal 70a has a computer 72a and a headset 74a. The computer 72a receives, through the server 60, an image and a sound of the customer 50a acquired by the robot 40a. The image received by the computer 72a is provided to the operator 80a through a screen of the computer 72a. In addition, the sound received by the computer 72a is provided to the operator 80a through the headset 74a. In addition, the server 60 provides, to the computer 72a, various types of customer information such as a current emotion of the customer 50a or the item purchase history of the customer 50a.

At the operator terminal 70a, the headset 74a has a microphone function, and transmits, to the server 60, sound data of the operator 80a acquired using the microphone function. The server 60 transmits, to the robot 40a and through the communication network 90, utterance text data based on the sound data. The robot 40a utters according to the received utterance text data. Thereby, the operator 80a can serve the customer 50a through the robot 40a.

In addition, the operator terminal 70a has a camera function, and transmits, to the server 60, an image of the operator 80a acquired using the camera function. Based on information such as a sound and an image of the operator 80a received from the computer 72a, the server 60 identifies an emotion of the operator 80a. Upon determining that an emotion of the operator 80a worsened, the server 60 requests the operator 80b currently not serving a customer to serve the customer 50a in place of the operator 80a having the worsened emotion. The operator 80b serves the customer 50a through the operator terminal 70b and robot 40a.

Thereby, with the customer serving system 10, it is possible to replace operators if it is determined that the operator 80a cannot serve a customer appropriately, for reasons such as a worsened emotion of the operator 80a.

The robot 40b and robot 40c have functions which are approximately the same as those of the robot 40a. In an explanation of the customer serving system 10, the robot 40a, robot 40b and robot 40c are collectively referred to as a robot 40 in some cases. In addition, the operator terminal 70b has a computer 72b and a headset 74b, and has functions which are approximately the same as those of the operator terminal 70a. The operator terminal 70c has a computer 72c and a headset 74c, and has functions which are approximately the same as those of the operator terminal 70a. In an explanation of the customer serving system 10, the operator terminal 70a, operator terminal 70b and operator terminal 70c are collectively referred to as an operator terminal 70 in some cases.

In an explanation of the customer serving system 10, operation of a combination of the robot 40a and the operator terminal 70a or a combination of the robot 40a and the operator terminal 70b is particularly mentioned in some cases. However, the combination of the robot 40 and the operator terminal 70 is not limited to only those combinations, and the same operation can be realized in any combination.

Figure 2:
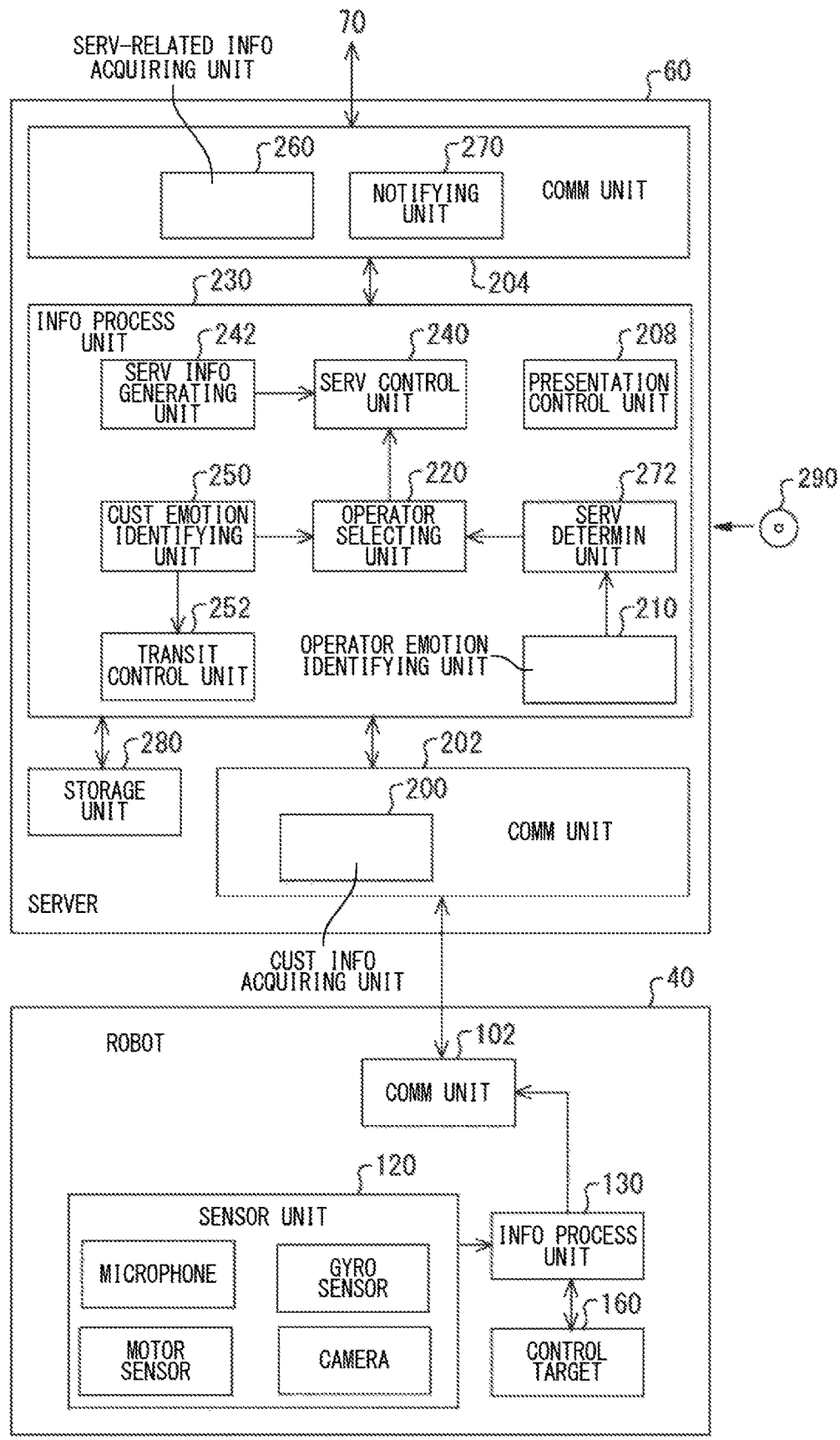
FIG. 2 schematically shows the functional block configurations of a robot 40 and a server 60.

FIG. 2 schematically shows the functional block configurations of the robot 40 and the server 60. First, the functional block configuration of the robot 40 is explained. The robot 40 has a sensor unit 120, an information processing unit 130, a control target 160 and a communicating unit 102. The information processing unit 130 may be a processor such as an MPU. The communicating unit 102 is responsible for communication with the server 60. The communicating unit 102 may be a communication device such as a network IF.

The control target 160 includes a speaker. The control target 160 also includes motors to drive movable portions such as limbs or a head portion of the robot 40, or the like.

The sensor unit 120 has various types of sensors such as a microphone, a gyro sensor, a motor sensor or a camera. The microphone of the sensor unit 120 acquires ambient sounds. For example, the microphone of the sensor unit 120 acquires sounds of a customer 50. The camera of the sensor unit 120 captures an image using visible light and generates image information. The gyro sensor of the sensor unit 120 detects the angular velocities of the entire robot 40 and each unit of the robot 40. The motor sensor of the sensor unit 120 detects the rotation angles of the drive axes of motors to drive movable portions of the robot 40.

The sensor unit 120 outputs, to the information processing unit 130, various types of sensor data such as sound data acquired using the microphone, images captured by the camera, angular velocities detected by the gyro sensor or rotation angles detected by the motor sensor. The information processing unit 130 supplies acquired sensor signals to the communicating unit 102 and causes them to be transmitted to the server 60. In addition, the information processing unit 130 decides behavior of the robot 40 based on various types of sensor data detected at the sensor unit 120. The information processing unit 130 controls the control target 160 based on the decided behavior.

For example, the information processing unit 130 decides contents of utterance by the robot 40, movement of limbs of the robot 40 or the like based on various types of sensor data or information acquired from the server 60. Specifically, the information processing unit 130 analyzes sound data acquired using the microphone of the sensor unit 120 to identify a content of utterance by the customer 50. In addition, the information processing unit 130 identifies a facial expression of the customer 50 based on image information generated by the camera of the sensor unit 120. The information processing unit 130 decides contents of utterance by the robot 40 or movement of limbs of the robot 40 based on contents of utterance by the customer 50, facial expressions of the customer 50 or the like and controls a speaker and a motor of the control target 160 to cause the robot 40 to utter and operate the limbs or the like. Thereby, the robot 40 can understand contents of utterance by the customer 50 or the like, engage in conversation with the customer 50, guide the customer 50, and so on. In this manner, the robot 40 can autonomously serve the customer 50.

The robot 40 may transmit information acquired at the sensor unit 120 or the like to the server 60, and the server 60 may decide contents of utterance by the robot 40, movement of limbs of the robot 40 or the like. The robot 40 may receive instruction information about utterance contents, movement of limbs or the like decided at the server 60, and utter or operate the limbs based on the instruction information. If the server 60 decides behavior of the robot 40 in this manner also, the robot 40 can be regarded as being autonomously serving because human instructions are substantially not involved in the behavior of the robot 40.

Contents that the robot 40 utters may be decided at the server 60 and transmitted to the robot 40. In this case, a block including a portion at the server 60 that decides utterance contents and the robot 40 may function as a customer serving apparatus.

Next, the functional block configuration of the server 60 is explained. The server 60 has an information processing unit 230, a communicating unit 202, a communicating unit 204 and a storage unit 280. The information processing unit 230 has a serving control unit 240, a customer emotion identifying unit 250, a transition control unit 252, an operator emotion identifying unit 210, an operator selecting unit 220, a serving information generating unit 242 and a presentation control unit 208. Functions of the information processing unit 230 may be implemented by a processor such as an MPU. For example, the functions of the serving control unit 240, customer emotion identifying unit 250, transition control unit 252, operator emotion identifying unit 210, operator selecting unit 220, serving information generating unit 242 and presentation control unit 208 may be realized by a program stored on a recording medium 290 being read in by the processor.

The communicating unit 202 is responsible for communication with the robot 40. The communicating unit 202 has a customer information acquiring unit 200. The communicating unit 204 is responsible for communication with the operator terminal 70. The communicating unit 204 has a notifying unit 270 that is mainly responsible for notification to the operator 80. The communicating unit 202 and communicating unit 204 may be communication devices such as network IFs. The storage unit 280 has a storage medium such as a hard disk drive or a flash memory. In addition, the storage unit 280 has a volatile storage device such as a RAM. The storage unit 280 stores data required for execution of processes by the information processing unit 230 or the like, besides program codes to be read out by the serving control unit 240 at the time of execution and various types of transient data.

The customer information acquiring unit 200 acquires customer information which is information about customers that can be served by the robot 40. For example, the customer information acquiring unit 200 receives, through the communication network 90, information about customers acquired by the robot 40. The customer information may include at least any one of pieces of information about: customer images acquired by the robot 40; customer utterance contents acquired by the robot 40; and the history of purchase of items purchased by customers in the past. The history of purchase of items purchased by customers in the past may be stored in the storage unit 280.

The presentation control unit 208 causes customer information acquired by the customer information acquiring unit 200 to be presented to a first operator. The first operator is one operator among the operators 80. The presentation control unit 208 causes the customer information to be transmitted from the communicating unit 204 to the operator terminal 70, and causes the computer 72 of the operator terminal 70 to display the customer information.

Based on operation of the first operator, the serving information generating unit 242 generates first serving information indicative of a serving content according to which the robot 40 should serve a customer. For example, based on sound data of the first operator acquired from the operator terminal 70, the serving information generating unit 242 generates utterance text data according to which the robot 40 is caused to utter.

The serving control unit 240 causes the first operator to serve the customer through the robot 40 by instructing the robot 40 to serve the customer based on the first serving information. Specifically, the serving control unit 240 transmits the utterance text data to the robot 40 and causes the robot 40 to utter.

The operator emotion identifying unit 210 identifies an emotion of the first operator. Based on the emotion of the first operator, the serving determining unit 272 determines whether or not to maintain a state where the first operator is serving the customer through the robot 40.

Specifically, the operator emotion identifying unit 210 identifies a type and intensity of an emotion of the first operator. If an intensity exceeding a predetermined value is identified about a predetermined type of emotion by the operator emotion identifying unit 210, the serving determining unit 272 determines not to maintain a state where the first operator is serving the customer through the robot 40. Whether or not "an intensity exceeding a predetermined value is identified about a predetermined type of emotion" is referred to as a serving stop condition in some cases.

More specifically, the operator emotion identifying unit 210 identifies an intensity of anger of the first operator. Then, if the intensity of anger exceeded a predetermined value, the serving determining unit 272 determines not to maintain a state where the first operator is serving the customer through the robot 40.

If the serving determining unit 272 determined not to cause the robot 40 to perform serving based on the first serving information, the operator selecting unit 220 selects a second operator to serve the customer from a plurality of operators. Then, the notifying unit 270 notifies the second operator to start serving the customer. Specifically, the notifying unit 270 transmits a serving notification to an operator terminal 70 manipulated by the second operator.

After the notifying unit 270 notifies the second operator to start serving the customer, based on operation of the second operator, the serving information generating unit 242 generates second serving information indicative of a serving content according to which the robot 40 should serve the customer. The second serving information may be utterance text data indicative of an utterance content based on sound data of the second operator. The serving control unit 240 causes the second operator to serve the customer through the robot 40 by instructing the robot 40 to serve the customer based on the second serving information.

The robot 40 can be in an autonomous operation state where it autonomously serves a customer and in an operator serving state where it serves a customer based on serving information based on operation of an operator. If the robot 40 makes a transition from the autonomous operation state to the operator serving state, the notifying unit 270 notifies an operator of serving history information indicative of a content indicating how the robot 40 autonomously served a customer in the autonomous operation state. Thereby, the operator can check how the robot 40 served and decide a serving content.

The notifying unit 270 may notify an operator of information indicative of the type of an emotion of a customer. Thereby, the operator 80 can decide an appropriate serving content taking an emotion of a customer into consideration.

Based on the state of a customer detected by the robot 40, the customer emotion identifying unit 250 identifies a type and intensity of an emotion of the customer being served by the robot 40. If an intensity exceeding a predetermined value is identified about a predetermined type of emotion by the customer emotion identifying unit 250, the transition control unit 252 causes the robot 40 to make a transition from the autonomous operation state to the operator serving state. Thereby, for example if an emotion of a customer worsened while the robot 40 was autonomously serving him/her, an operator can start serving the customer. On the other hand, if an emotion of a customer did not worsen while the robot 40 was autonomously serving him/her, operators are not required to serve the customer.

The customer emotion identifying unit 250 identifies the intensity of anger of a customer being served by the robot 40. If an intensity exceeding a predetermined value is identified about a predetermined type of emotion by the customer emotion identifying unit 250, the transition control unit 252 causes the robot 40 serving the customer to make a transition from the autonomous operation state to the operator serving state. The customer information may include at least any one of pieces of information about: customer images acquired by the robot 40; customer utterance contents acquired by the robot 40; and the history of purchase of items purchased by customers in the past.

Figure 3:
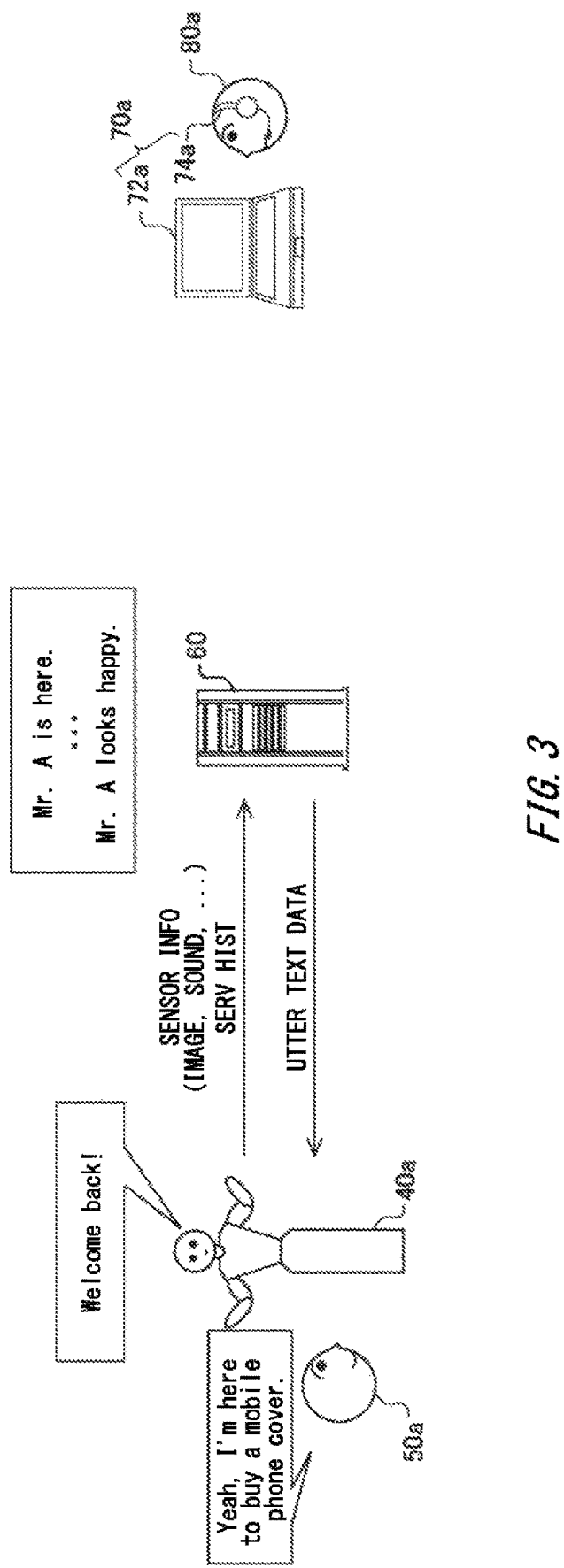

FIG. 3 is a figure for schematically explaining a sequence in a situation where the robot 40*a* in the autonomous operation state is serving the customer 50*a*. The robot 40*a* transmits, to the server 60, sensor information such as sounds or images detected at the sensor unit 120.

Here, it is assumed that an image of the face of the customer 50*a* and the name of the customer 50*a*, "Mr. A", are already stored in the storage unit 280 of the server 60. For example, the serving control unit 240 has studied the name of the customer 50*a* from conversations or the like between the robot 40*a* and the customer 50*a* in the past, and an image of the face of the customer 50*a* and the name "Mr. A" are stored in the storage unit 280 in association with each other.

In this case, the serving control unit 240 collates a facial image received from the robot 40*a* and facial images stored in the storage unit 280, and determines that a visitor is Mr. A who has visited the location in the past. Thereby, information "Mr. A is here." is generated. Then, the serving control unit 240 decides to utter "Welcome back." as an appropriate serving content in this situation, transmits text data of the utterance content to the robot 40*a* and causes the robot 40*a* to utter. When the robot 40*a* receives a reply from the customer 50*a* after the utterance, "Yeah, I'm here to buy a mobile phone cover.", the robot 40*a* transmits the sound data to the server 60.

For each type of emotion among a plurality of types of emotion, the customer emotion identifying unit 250 identifies the emotional intensity of the customer 50*a* based on information such as sounds or images received from the robot 40*a*. For example, the customer emotion identifying unit 250 identifies the intensity of each of "joy", "anger", "sadness" and "happiness". As one example, the customer emotion identifying unit 250 identifies the type of an emotion and its emotional intensity based on a facial expression of a face identified in an image, the state of voice identified in a sound, or the like. Here, examples of the state of voice may include a state of voice representing whether or not the voice implies anger, whether or not the voice sounds happy, and so on. The customer emotion identifying unit 250 may extract a sound feature amount such as the fundamental frequency from a sound, and identify the state of voice based on the extracted sound feature amount. The customer emotion identifying unit 250 may identify the most intense emotion as a current emotion of the customer 50*a*.

Here, if an emotion of "happiness" among "joy, anger, sadness and happiness" is identified as an emotion of the customer 50*a*, the serving control unit 240 generates information, "Mr. A looks happy.". Because the customer emotion identifying unit 250 has determined that the emotion of the customer 50*a* has not worsened, the transition control unit 252 preserves the autonomous operation state of the robot 40*a* without requesting the operator 80 to deal with the customer 50*a*. The communicating unit 202 at the server 60 continues receiving, from the robot 40*a*, the serving history indicative of contents of utterance or contents of action by the robot 40*a* or the like, and the storage unit 280 stores the serving history in association with times.

Figure 4:
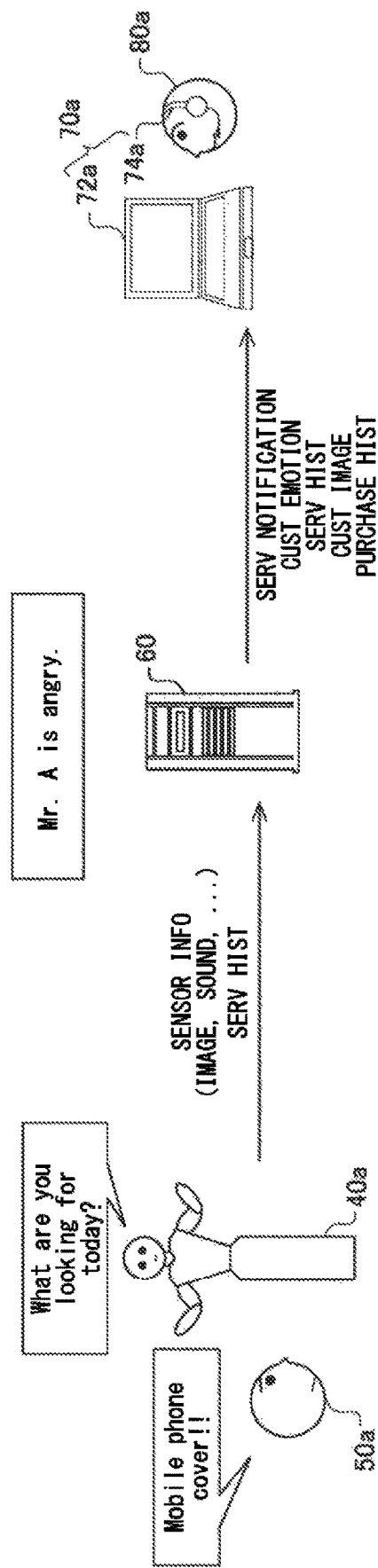

FIG. 4 is a figure for schematically explaining a sequence until the operator 80*a* is requested to serve the customer 50*a*. Based on a sound of the customer 50*a* saying "Mobile phone cover!!" and a facial expression of the customer 50*a* after the robot 40*a* is caused to utter "What are you looking for today?", the server 60 determines that an emotion of "anger" exceeded a threshold, and generates information "Mr. A is angry.". In response to this, the transition control unit 252 decides to cause the robot 40*a* to make a transition from the autonomous operation state to the operator serving state.

In this case, the operator selecting unit 220 selects an operator 80 to serve the customer 50*a* from among operators 80. For example, the operator selecting unit 220 selects, as an operator 80 to serve the customer 50*a*, an operator other than operators who are currently serving other customers 50. The more intense an emotion of the customer 50*a* is, the higher the ability to serve of an operator 80 selected by the operator selecting unit 220 may be. Information indicative of the abilities to serve of operators 80 may be stored in the storage unit 280 in association with information identifying the operators 80, and the operator selecting unit 220 may refer to the information stored in the storage unit 280 to select an operator 80 to serve the customer 50*a*. The ability to serve of the operator 80*a* is mentioned below in relation to a past record table.

If the operator selecting unit 220 selects the operator 80*a* as an operator to serve the customer 50*a*, the notifying unit 270 transmits a serving notification to the operator terminal 70*a* manipulated by the operator 80*a*. In this case, the notifying unit 270 transmits, together with the serving notification and to the operator terminal 70*a*, information indicative of an emotion of the customer 50a, information indicative of the history of serving between the robot 40a and the customer 50a, an image of the customer 50a, and information indicative of the past purchase history of the customer 50a.

Figure 5:
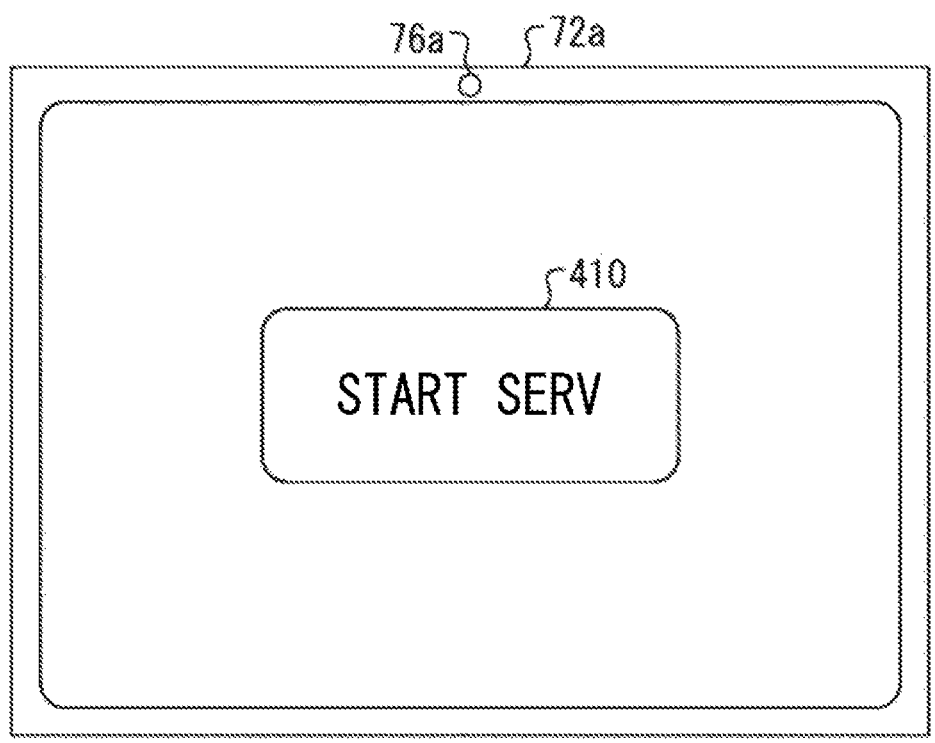

FIG. 5 schematically shows a display content of a serving notification issued by the operator terminal 70a. At the operator terminal 70a, upon reception of the serving notification from the server 60, the computer 72a displays on a screen of the computer 72a an object 410 indicative of that serving is requested. The computer 72a notifies the operator 80a by outputting a notification sound to a headset 74a worn by the operator 80a. When the operator 80a pressed the object 410 and the computer 72a thereby detects the pressing of the object 410, the computer 72a makes a transition to a serving mode.

Figure 6:
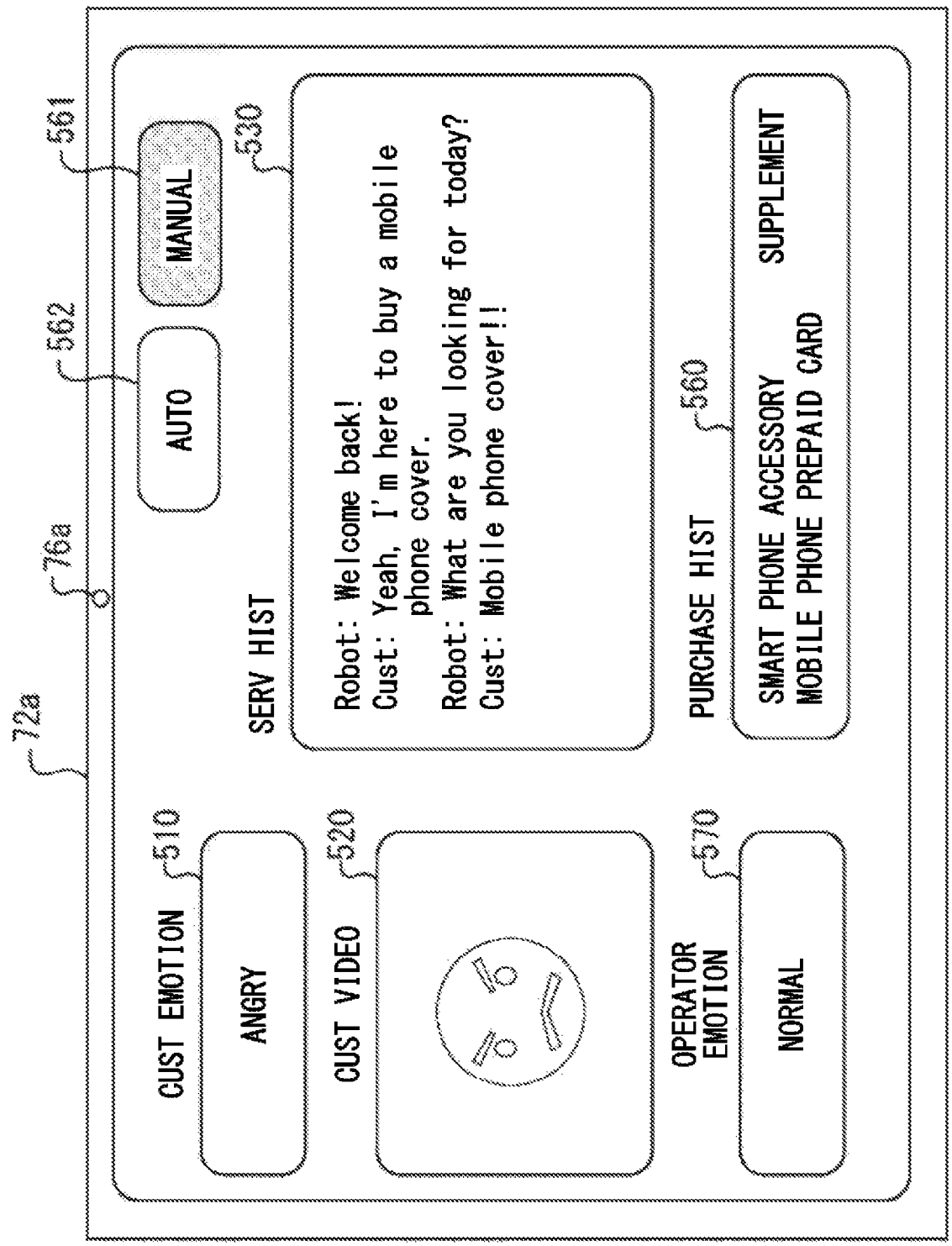
FIG. 6 schematically shows a display content of a computer 72a in a situation where the robot 40a is in an operator serving state.

FIG. 6 schematically shows a display content of the computer 72a in a situation where the robot 40a is in the operator serving state. At the operator terminal 70a, the computer 72a displays on an object 510 information indicative of an emotion of the customer 50a received from the server 60. In addition, the computer 72a displays on an object 520 an image of the face of the customer 50a received from the server 60. In addition, the computer 72a displays on an object 530 information indicative of the history of serving between the robot 40a and the customer 50a received from the server 60. In addition, the computer 72a displays on an object 560 information indicative of the purchase history of the customer 50a received from the server 60.

In addition, the computer 72a displays a manual button 561 and an auto button 562 on the screen. The auto button 562 is a button for instructing the robot 40a to make a transition to the autonomous serving state. The manual button 561 is a button for instructing the robot 40a to make a transition to the operator serving state. Because in FIG. 6, the robot 40a is in a state after making a transition to the operator serving state, the manual button 561 is already selected, and the auto button 562 can be selected.

The computer 72a acquires, from the server 60, a sound acquired by the robot 40a, outputs it to the headset 74a and provides the sound to the operator 80a. Here, the computer 72a acquires a sound collected by a microphone unit of the headset 74a as sound data, and transmits the sound data to the server 60.

The sound data may be sound data itself representing sound waveforms. In this case, the sound data may be converted into text at the server 60, and the text may be transmitted to the robot 40a as utterance text data. The computer 72a may extract language from the sound data and converts it into a text, and transmit the obtained text data to the server 60. In this case, the text data transmitted to the server 60 may be transmitted with no changes made therein as data of a text to be uttered by the robot 40a.

In addition, the computer 72a transmits, to the server 60, an image of the operator 80a acquired by the camera 76a provided to the computer 72a. Based on the received sound and image of the operator 80a, the operator emotion identifying unit 210 of the server 60 identifies an emotion of the operator 80a. The emotion identified by the operator emotion identifying unit 210 is transmitted from the communicating unit 204 of the server 60 to the operator terminal 70a. The computer 72a displays on an object 570 information indicative of the emotion of the operator 80a received from the server 60.

Figure 7:
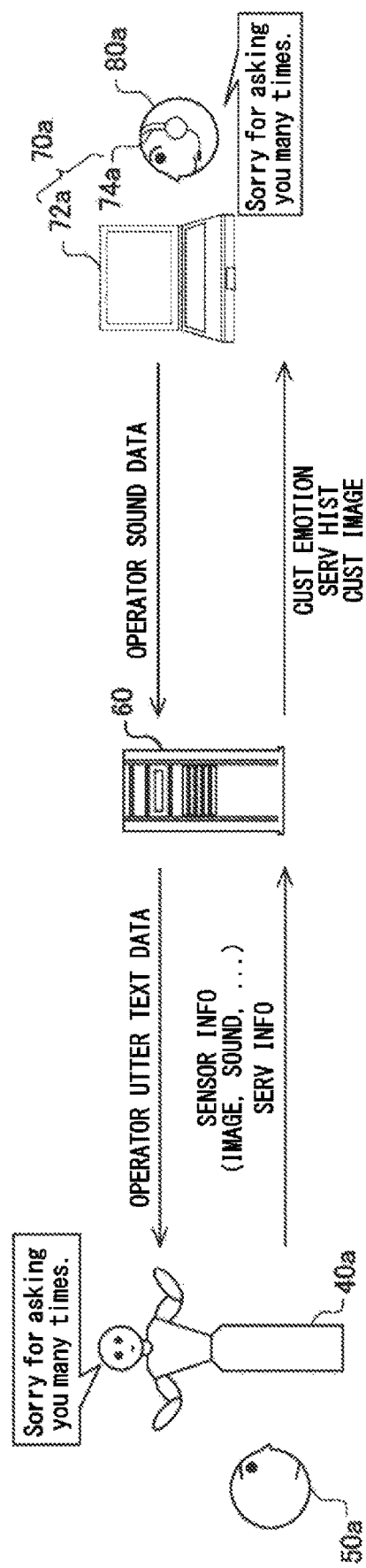

FIG. 7 schematically shows a sequence in a situation where the robot 40a is serving the customer 50a based on an action of the operator 80a.

Taking into consideration the serving history in the object 530 of FIG. 6, the operator 80a utters, "Sorry for asking you many times.", and then sound data representing "Sorry for asking you many times." is transmitted from the computer 72a to the server 60. At the server 60, upon reception of the sound data by the communicating unit 204, based on the received sound data, the serving information generating unit 242 generates serving information including utterance text data according to which the robot 40a is caused to utter. The serving control unit 240 causes the serving information to be transmitted to the robot 40a through the communicating unit 202, and causes the robot 40a to utter according to the utterance text data. Thereby, the computer 72a and server 60 cause the operator 80a to serve the customer 50a through the robot 40a.

The robot 40a transmits sensor information detected at the sensor unit 120 to the server 60 one after another, and at the server 60, an emotion of the customer 50a is determined. Then, information indicative of an emotion of a customer, the history of serving between the robot 40a and the customer 50a and customer images are transmitted from the server 60 to the computer 72a one after another.

Figure 8:
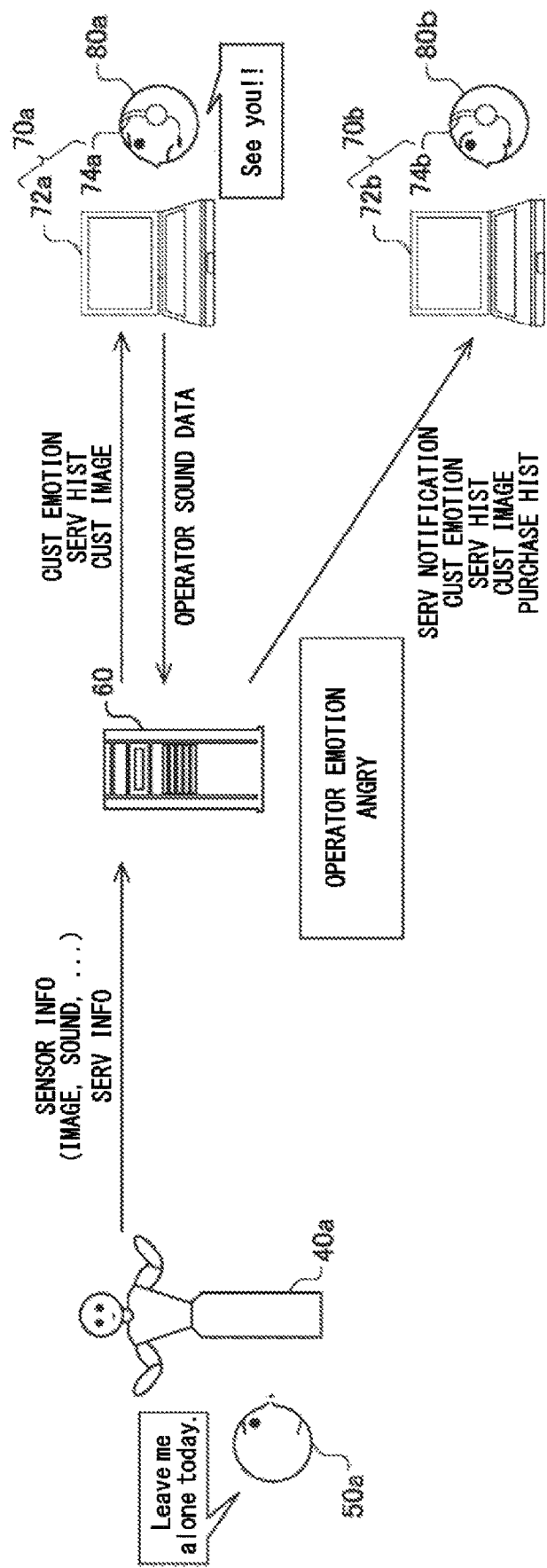
FIG. 8 is a figure for schematically explaining a sequence until the server for the customer 50a is switched to the operator 80b.

FIG. 8 is a figure for schematically explaining a sequence until the server for the customer 50a is switched to the operator 80b. An utterance by the customer 50a, "Leave me alone!", is transmitted as sound data to the computer 72a and output from the headset 74a. If in response to this, the operator 80a gets angry and utters "See you!!", the computer 72a transmits, to the server 60, sound data generated based on the utterance. In addition, the computer 72a transmits, to the server 60, an image of the operator 80a acquired using the camera 76a.

At the server 60, based on the sound data, "See you!!", that was uttered by the operator 80a and a facial expression identified in an image of the face of the operator 80a, the operator emotion identifying unit 210 identifies the type of an emotion of the operator 80a and its intensity. The operator emotion identifying unit 210 may identify an emotion based on a facial image and sound data by a process similar to operation of the customer emotion identifying unit 250. If the serving determining unit 272 determines that the emotional intensity of "anger" of the operator 80a exceeded a threshold, the operator selecting unit 220 selects, from the operators 80, the operator 80b as an operator to respond to the customer 50a through the robot 40a.

If the operator selecting unit 220 selects the operator 80b as an operator to serve the customer 50a, the notifying unit 270 transmits a serving notification to the operator terminal 70b manipulated by the operator 80b. In this case, the notifying unit 270 transmits, together with the serving notification and to the operator terminal 70b, information indicative of an emotion of the customer 50a, information indicative of the history of serving between the robot 40a and the customer 50a, an image of the customer 50a, and information indicative of the past purchase history of the customer 50a.

At the operator terminal 70b, upon reception by the computer 72b of the serving notification from the server 60, the computer 72b displays a screen similar to the screen shown in FIG. 5. As operation of the operator terminal 70b in response to the response notification is approximately the same as the operation explained with reference to FIG. 5 or other figures, an explanation thereof is omitted. Upon making a transition to the serving mode, the computer 72b displays the screen shown in FIG. 9.

Figure 9:
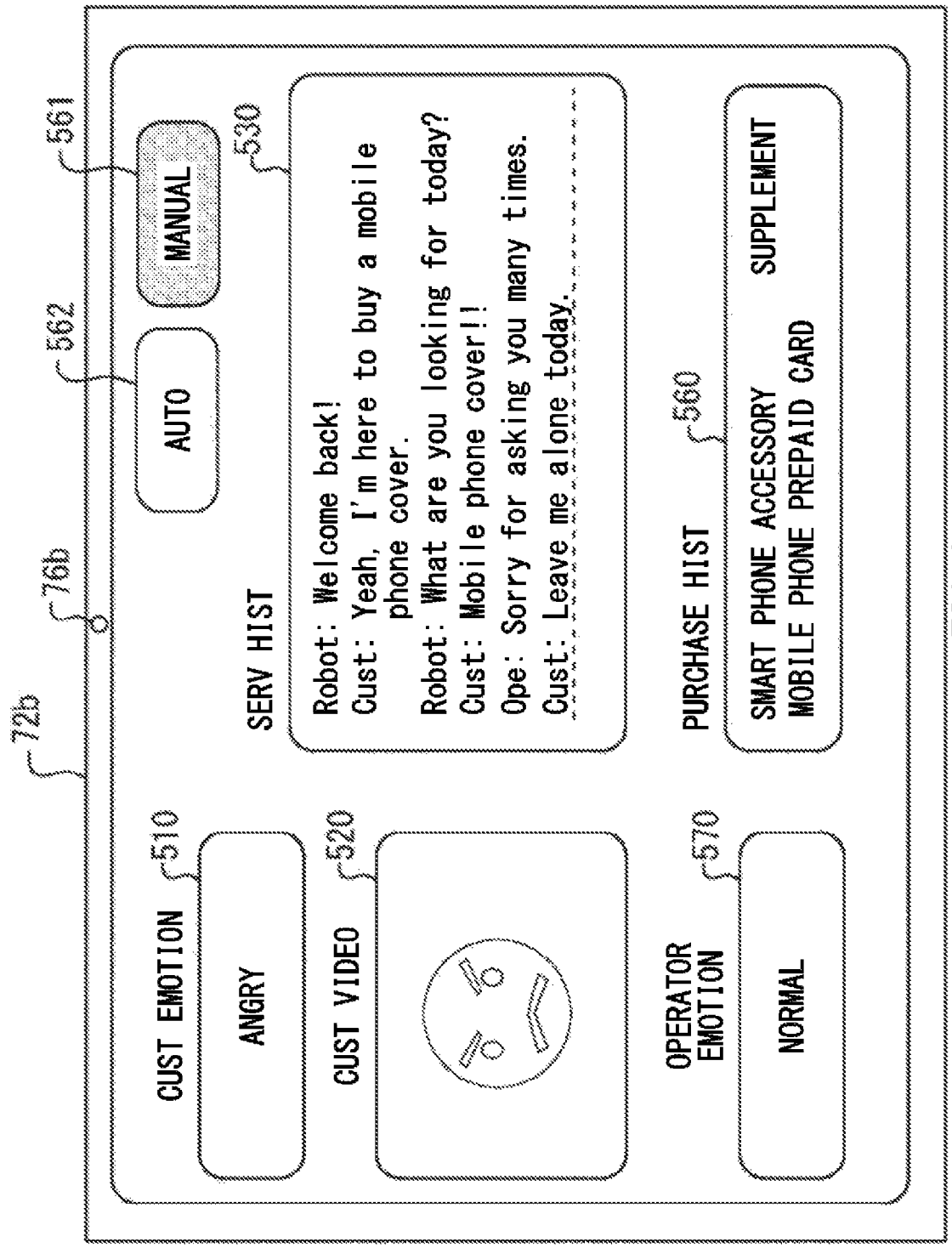
FIG. 9 schematically shows a content displayed by a computer 72b when it is in a serving mode.

FIG. 9 schematically shows a content displayed by the computer 72b when it is in a serving mode. As shown in the figure, the computer 72b displays the same type of information as the information included in the display content shown in FIG. 6.

The serving history that the computer 72b displays on the object 530 includes the history of serving for the customer 50a by the robot 40a in the autonomous operation state and the history of serving for the customer 50a by the operator 80a through the robot 40a. Thereby, the operator 80b can check the past serving history of the operator 80a, and start serving the customer 50a.

Figure 10:
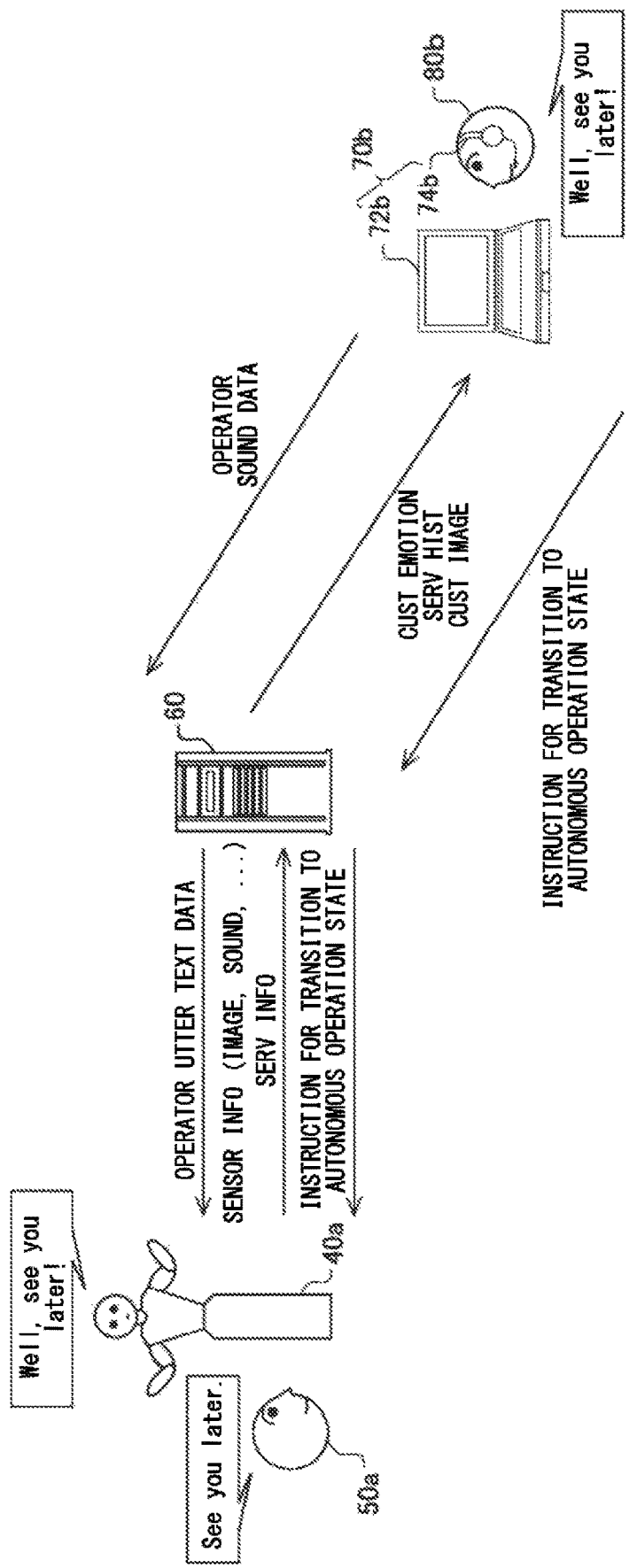
FIG. 10 schematically shows a sequence until the robot 40a returns to an autonomous operation state.

FIG. 10 schematically shows a sequence until the robot 40a returns to the autonomous operation state. The operator 80b checks the serving history shown in FIG. 9, and if the operator 80b utters, "Well, see you later!", the sound of the operator 80b is acquired by the headset 74b, and the computer 72b transmits sound data of the utterance to the server 60.

At the server 60, the serving information generating unit 242 converts the received sound data into utterance text data, transmits the utterance text data to the robot 40a, and causes the robot 40a to utter. Thereafter, the sound data representing the utterance, "See you later!", from the customer 50a is transmitted to the operator terminal 70b through the server 60. If it is determined to end serving, the operator 80b presses the auto button 562 on the screen of the computer 72b, and causes the computer 72b to transmit, to the server 60, a transition instruction to cause the robot 40a to make a transition to the autonomous operation state.

At the server 60, upon reception by the communicating unit 204 of the instruction to make a transition to the autonomous operation state, the serving control unit 240 transmits, to the robot 40a, an instruction to make a transition to the autonomous operation state. At the robot 40a, upon reception by the communicating unit 102 of the instruction to make a transition to the autonomous serving state, the information processing unit 130 and serving control unit 240 resume an autonomous serving process based on sensor information from the sensor unit 120a. In this manner, with the customer serving system 10, transitions between serving by the operator 80 and autonomous serving by the robots 40 can be made seamlessly.

FIG. 11 schematically shows a past record table used for selecting an appropriate operator 80. The data of the past record table is stored in the storage unit 280 of the server 60. Specifically, in association with operator identification information identifying operators 80, the storage unit 280 stores attributes of customers 50 served by the respective operators 80 and the types of emotion of the customers 50 before the operators 80 start serving, and serving past record values in association with each other.

The attributes of the customers 50 include age groups of customers, genders of customers or the like. The types of emotion of customers at the time of serving indicate "anger", "sadness" or the like which are the types of emotion that necessitate serving by the operators 80. The serving past record values are added if emotions of the customer 50 turned good due to serving by the operators 80. For example, if the intensity of anger of a customer 50 decreased by a certain value or more due to serving by an operator 80, the information processing unit 230 adds a predetermined value to a corresponding response past record value, and stores the response past record value in the storage unit 280. If an emotion of a customer 50 turned "joy" or "happiness" from "anger" or "sadness" due to serving by an operator 80, the information processing unit 230 may add a predetermined value to a corresponding response past record value, and store the response past record value in the storage unit 280.

For example, if in the above-mentioned example, the emotional intensity of "anger" of the customer 50a decreased by a certain value or more due to serving by the operator 80b, a predetermined value is added to a response past record value stored in the past record table in association with operator identification information of the operator 80b.

When selecting an operator 80 to serve the customer 50, the operator selecting unit 220 refers to the data of the past record table stored in the storage unit 280 and selects an operator 80 who can appropriately serve the target customer 50. For example, the operator selecting unit 220 searches the data in the past record table for operator identification information associated with information matching an attribute and type of current emotion of the target customer 50. Then, the operator selecting unit 220 more preferentially extracts operator identification information associated with a higher serving past record value in the searched operator identification information. For example, the operator selecting unit 220 extracts operator identification information associated with the highest serving past record value in the searched operator identification information. Then, the operator selecting unit 220 selects, as an operator to serve the target customer 50, an operator 80 identified by the extracted operator identification information. Thereby, it becomes possible to select an operator 80 with a high serving ability for an attribute or emotion of the target customer 50.

As has been explained above, with the customer serving system 10, if in a system where an operator 80 serves a customer through a robot 40, it is determined that a situation has occurred where the operator 80 cannot serve a customer 50 appropriately, it is possible to stop serving by the operator 80 and switch the server to another operator 80.

At the server 60, if the emotional intensity of "sorrow" exceeded a predetermined value, the serving determining unit 272 may determine not to maintain a state where the operator 80 is serving the customer 50 through the robot 40. Other than this, if the emotional intensity of "sadness" of the operator 80 exceeded a predetermined value, the serving determining unit 272 may determine not to maintain a state where the operator 80 is serving the customer 50 through the robot 40. Various emotions, other than the above-mentioned "anger", "sorrow" and "sadness", can be applied as the types of emotion used as conditions under which serving by operators 80 should be stopped. In addition, an emotion of an operator 80 is one example a parameter used by the serving determining unit 272 as a serving stop condition. Other than an emotion of an operator 80, the serving determining unit 272 may determine not to maintain a state where an operator 80 is serving a customer 50 if the state of the operator 80 is determined to match a predetermined type of state. Examples the state of operators 80 may include tiredness of operators 80 and the like. At the server 60, the information processing unit 230 may identify tiredness of an operator 80 based on a sound or facial expression of the operator 80.

In addition, if the serving determining unit 272 determines that a condition under which serving by operators 80 should be stopped is met, the information processing unit 230 may notify an administrator of the operators 80 that the serving stop condition is met, instead of switching operators 80 or in addition to switching operators 80. The administrator of the operators 80 may be a supervisor to supervise work of the operators 80 or the like.

In the explanation with reference to FIG. 4, mainly, situations where the server 60 makes a transition to the operator serving state if an emotion of the customer 50 worsened were explained. Other than this, the server 60 may make a transition to the operator serving state if it is determined that a robot 40 in the autonomous operation state cannot appropriately interact with a customer 50. For example, the server 60 may make a transition to the operator serving state if an appropriate utterance content to be uttered by the robot 40 cannot be decided. In addition, the server 60 may make a transition to the operator serving state if a customer 50 of a predetermined gender is visiting. For example, if a woman is visiting, a transition may be made to the operator serving state. For example, at places where commodities aimed at women such as cosmetics are sold, a robot 40 may autonomously serve a man, and an operator 80 may serve a woman. In addition, if a predetermined particular customer 50 is visiting, a transition may be made to the operator serving state. For example, an operator 80 may serve a customer 50 who frequently purchases high-price items. In addition, an operator 80 may serve a customer 50 whose emotion worsened in the past due to serving by a robot 40. In addition, an operator 80 may serve simply if a customer is visiting. For example, if there is no human around, a robot 40 may invite customers in in the autonomous operation state, and may make a transition to the operator serving state if a human is approaching.

The functions of the server 60 may be implemented by one or more computers. At least some of the functions of the server 60 may be implemented by a virtual machine. In addition, at least some of the functions of the server 60 may be implemented by cloud computing. In addition, although in the above-mentioned explanation, the function of deciding contents of utterance by the robot 40a was served by the server 60, at least some of the functions related to control of the robot 40a among the functions of the server 60 may be implemented in the robot 40a. In addition, at least some functions of the functions related to control of the operator terminal 70 among the functions of the server 60 may be implemented in the operator terminal 70. The robots 40 are one example of customer serving apparatuses. Various forms other than robots may be adopted as customer serving apparatuses.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE SYMBOLS

10: customer serving system; 40: robot; 50: customer; 60: server; 90: communication network; 70: operator terminal; 72: computer; 74: headset: 76: camera; 80: operator; 102: communicating unit; 120: sensor unit; 130: information processing unit; 160: control target; 200: customer information acquiring unit; 202: communicating unit; 204: communicating unit; 208: presentation control unit; 210: operator emotion identifying unit; 220: operator selecting unit; 230: information processing unit; 240: serving control unit; 242: serving information generating unit; 250: customer emotion identifying unit; 252: transition control unit; 270: notifying unit; 272: serving determining unit; 280: storage unit; 290: recording medium; 410: object; 510; 520; 530; 560; 570: object; 561: manual button; 562: auto button

What is claimed is:

1. A customer serving control system comprising:
    a customer information acquiring unit that acquires customer information which is information about a customer that can be served by a customer serving apparatus;
    a presentation control unit that causes the customer information to be presented to a first operator;
    a serving information generating unit that generates, based on operation of the first operator, first serving information indicative of a serving content according to which the customer serving apparatus should serve the customer;
    a serving control unit that causes the first operator to serve the customer through the customer serving apparatus by instructing the customer serving apparatus to serve the customer based on the first serving information;
    an operator emotion identifying unit that identifies an emotion of the first operator; and
    a serving determining unit that determines, based on an emotion of the first operator, whether or not to maintain a state where the first operator is serving the customer through the customer serving apparatus, wherein
    the customer serving apparatus can be in a first state where it autonomously communicates with a customer and in a second state where it communicates with a customer based on serving information based on operation of an operator, and
    the customer serving control system further comprises
    a serving history notifying unit that notifies an operator of serving history information indicative of a content according to which the customer serving apparatus autonomously served the customer when it is in the first state, if the customer serving apparatus makes a transition from the first state to the second state;
    a customer emotion identifying unit that identifies a type and intensity of an emotion of a customer being served by the customer serving apparatus, based on a state of a customer detected by the customer serving apparatus; and
    a transition control unit that causes the customer serving apparatus to make a transition from the first state to the second state if an intensity exceeding a predetermined value is identified about a predetermined type of emotion by the customer emotion identifying unit.

2. The customer serving control system according to claim 1, wherein
    the operator emotion identifying unit identifies a type and intensity of an emotion of the first operator, and
    if an intensity exceeding a predetermined value is identified about a predetermined type of emotion by the operator emotion identifying unit, the serving determining unit determines not to maintain a state where the first operator is serving the customer through the customer serving apparatus.

3. The customer serving control system according to claim 2, wherein the operator emotion identifying unit identifies an intensity of anger of the first operator, and
if the intensity of anger exceeds a predetermined value, the serving determining unit determines not to maintain a state where the first operator is serving the customer through the customer serving apparatus.

4. The customer serving control system according to claim 1, further comprising:
an operator selecting unit that selects, from a plurality of operators, a second operator to serve the customer if the serving determining unit determines not to cause the customer serving apparatus to perform serving based on the first serving information; and
a serving notifying unit that notifies the second operator to start serving the customer.

5. The customer serving control system according to claim 4, wherein
after the serving notifying unit notifies the second operator to start serving the customer, based on operation of the second operator, the serving information generating unit generates second serving information indicative of a serving content according to which the customer serving apparatus should serve the customer, and
the serving control unit causes the second operator to serve the customer through the customer serving apparatus by instructing the customer serving apparatus to serve the customer based on the second serving information.

6. The customer serving control system according to claim 1, wherein
the first serving information includes text data indicative of a content of utterance by the first operator, and
the serving control unit transmits the text data to the customer serving apparatus and causes the customer serving apparatus to utter.

7. A customer serving control system comprising:
a customer information acquiring unit that acquires customer information which is information about a customer that can be served by a customer serving apparatus;
a presentation control unit that causes the customer information to be presented to a first operator;
a serving information generating unit that generates, based on operation of the first operator, first serving information indicative of a serving content according to which the customer serving apparatus should serve the customer;
a serving control unit that causes the first operator to serve the customer through the customer serving apparatus by instructing the customer serving apparatus to serve the customer based on the first serving information;
an operator emotion identifying unit that identifies an emotion of the first operator; and
a serving determining unit that determines, based on an emotion of the first operator, whether or not to maintain a state where the first operator is serving the customer through the customer serving apparatus, wherein the customer serving apparatus can be in a first state where it autonomously communicates with a customer and in a second state where it communicates with a customer based on serving information based on operation of an operator,
the serving information generating unit generates as the first serving information utterance text data indicative of a content of utterance by the first operator based on sound data of the first operator, and
the serving control unit transmits the utterance text data to the customer serving apparatus and causes the customer serving apparatus to utter the utterance text data.

8. The customer serving control system according to claim 1, wherein
the customer emotion identifying unit identifies an intensity of anger of a customer being served by the customer serving apparatus.

9. The customer serving control system according to claim 1, further comprising an emotion notifying unit that notifies an operator of information indicative of a type of an emotion of the customer.

10. The customer serving control system according to claim 1, wherein the customer information includes at least any one of pieces of information about: an image of the customer acquired by the customer serving apparatus; a content of utterance by the customer acquired by the customer serving apparatus; and a history of purchase of items purchased by the customer in a past.

11. A customer serving system comprising:
the customer serving control system according to claim 1; and
the customer serving apparatus.

12. A computer-readable medium having a program stored thereon, the program causing a computer to perform procedures of:
acquiring customer information which is information about a customer that can be served by a customer serving apparatus that can be in a first state where it autonomously communicates with a customer and in a second state where it communicates with a customer based on serving information based on operation of an operator;
causing the customer information to be presented to a first operator;
generating, based on operation of the first operator, first serving information indicative of a serving content according to which the customer serving apparatus should serve the customer;
causing the first operator to serve the customer through the customer serving apparatus by instructing the customer serving apparatus to serve the customer based on the first serving information;
identifying an emotion of the first operator;
determining, based on an emotion of the first operator, whether or not to maintain a state where the first operator is serving the customer through the customer serving apparatus;
notifying an operator of serving history information indicative of a content according to which the customer serving apparatus autonomously served the customer when it is in the first state, if the customer serving apparatus makes a transition from the first state to the second state;
identifying a type and intensity of an emotion of a customer being served by the customer serving apparatus, based on a state of a customer detected by the customer serving apparatus; and
causing the customer serving apparatus to make a transition from the first state to the second state if an intensity exceeding a predetermined value is identified about a predetermined type of emotion by the customer emotion identifying unit.

13. The customer serving control system according to claim 1, further comprising:
an operator selecting unit that selects, from a plurality of operators, an operator having a higher ability to serve as the intensity of the emotion of the customer being served by the customer serving apparatus becomes more intense.

\* \* \* \* \*